United States Patent [19]

Vale

[11] 4,328,497
[45] May 4, 1982

[54] METHOD AND SYSTEM FOR JAMMING ANALYSIS AND TRANSMISSION SELECTION

[75] Inventor: Christopher R. Vale, Elkridge, Md.

[73] Assignee: Westinghouse Electric Corp., Pittsburgh, Pa.

[21] Appl. No.: 176,624

[22] Filed: Aug. 11, 1980

[51] Int. Cl.³ .................................................. G01S 7/36
[52] U.S. Cl. ............................... 343/18 E; 324/77 B; 343/5 SA
[58] Field of Search .................... 343/5 SA, 18 E; 324/77 B

[56] References Cited

U.S. PATENT DOCUMENTS

| | | |
|---|---|---|
| 3,660,647 | 5/1972 | Pryor, Jr. . |
| 3,688,223 | 8/1972 | Pratt et al. . |
| 3,813,618 | 5/1974 | Hartemann et al. . |
| 3,831,116 | 8/1974 | Davis, Jr. et al. . |
| 3,868,608 | 2/1975 | Williams . |
| 3,942,140 | 3/1976 | Laker et al. . |
| 4,037,181 | 7/1977 | Ieki et al. . |
| 4,079,342 | 3/1978 | Solie . |
| 4,126,838 | 11/1978 | McCusker et al. . |
| 4,135,189 | 1/1979 | Josse ............................. 343/18 E |
| 4,163,958 | 8/1979 | Gerard . |
| 4,284,351 | 8/1981 | Alldritt et al. ............... 324/77 B X |

*Primary Examiner*—T. H. Tubbesing
*Attorney, Agent, or Firm*—H. W. Patterson

[57] ABSTRACT

A jamming analysis and transmission selection system for a radar wherein the frequencies present in the environment are sampled during a discrete time interval following each radar transmission; and utilizes a surface acoustic wave device having a plurality of spaced groups of interdigitated fingers on a substrate wherein each of said groups has a finger width and spacing to be resonant at each of a plurality of anticipated different interfering frequencies. The output of the device is sampled following each discrete time interval to identify the presence of the selected interfering frequencies to change the transmission frequency of the radar transmitter to a non-interfering frequency.

9 Claims, 7 Drawing Figures

METHOD AND SYSTEM FOR JAMMING ANALYSIS AND TRANSMISSION SELECTION

BACKGROUND OF THE INVENTION

1. Field of the Invention

The present invention relates to a frequency jamming analysis and transmission selection system; and more particularly, to an improved jamming analysis and transmission selection system for radar using a surface acoustic wave device to detect interfering frequencies that may be located in the vicinity of the radar's allowed transmit frequencies.

2. Description of the Prior Art

In order to transmit radar pulses and receive the echoes therefrom in an environment where other radar systems are operating; or where jamming of the transmitted frequencies may occur, it is customary to provide a radar system with the capability of transmitting and receiving selected ones of a plurality of distinct frequencies over a predetermined bandwidth. To prevent the particular frequencies that are interfering with or jamming the radar system, from preventing proper operation thereof, there has been provided what is termed a jamming analysis and transmission selection system (JATS). The typical JATS capability provides for receiving and analyzing any interfering signals during a portion of the time period between transmitted radar pulses; or in other words during a portion of the interpulse periods. Specifically, such a system utilizes the frequency generator of the transmitter to interrogate in sequence a plurality of predetermined frequencies over which the radar system is capable of transmitting; and then causes the same frequency generator of the radar transmitter to transmit pulses of a particular frequency which has demonstrated little or no noise or jamming. Such a system places a heavy burden on the frequency generator of the transmitter thus tending to adversely affect its stability. Such a system consumes approximately sixty to one hundred microseconds of each interpulse period for both interrogation and shifting to a new frequency. One proposed solution is to use a separate frequency generator for analyzing the anticipated frequencies; but does not appear feasible for many applications because of its size, complexity, and relative cost.

Thus, it is desirable to provide an improved JATS system that does not utilize the frequency generator of the transmitter to interrogate the transmit band, and yet is relatively simple in configuration and uncomplicated in construction.

SUMMARY OF THE INVENTION

Broadly, and in accordance with the present invention, there is provided a jamming analysis and transmission selection system for a radiant energy communication system that includes means to receive and apply during a preselected time interval any interfering frequencies in a selected bandwidth to a surface acoustic wave device (SAW) having a plurality of spaced groups of interdigitated fingers that are so configured to be each synchronous with a different anticipated interfering frequency. The output of the SAW device is sampled during each of a plurality of predetermined spaced sampling intervals to identify the effective presence or absence of each of such plurality of frequencies. The frequency generator of the transmitter may then be shifted to transmit over one of the effective absent frequencies.

More specifically, the present invention is a system for identifying the effective presence and absence of each of a plurality of frequencies that are capable of interfering with the proper operation of a radar system that includes a receiver having a gating means for receiving such interfering frequencies during a predetermined discrete time interval; and a surface acoustic wave device having an input transducer for converting the interfering radiant energy signals to acoustic signals. The surface acoustic wave device has a plurality of spaced groups of weighted interdigitated fingers, each group of which is positioned serially in the direction of wave propagation. Each group has finger width and finger spacing that is synchronous with a different one of the plurality of anticipated interfering frequencies. The number of such fingers in each group and each spacing between the groups is selected so that the propagation time of the frequencies over the fingers of each individual group and the group spacing therebetween, corresponds to at least the approximate predetermined discrete time interval. The output of the SAW device is sampled at each of a plurality of substantially equally spaced sampling intervals, which intervals are synchronous with the beginning of the predetermined discrete receiving time interval. The sampled signals, each of which is indicative of the effective presence or absence of one of the plurality of interfering frequencies may then be used to shift the frequency generator of the radar transmitter to transmit a frequency that will not be interfered with.

DESCRIPTION OF THE PREFERRED EMBODIMENT

Figure 1:
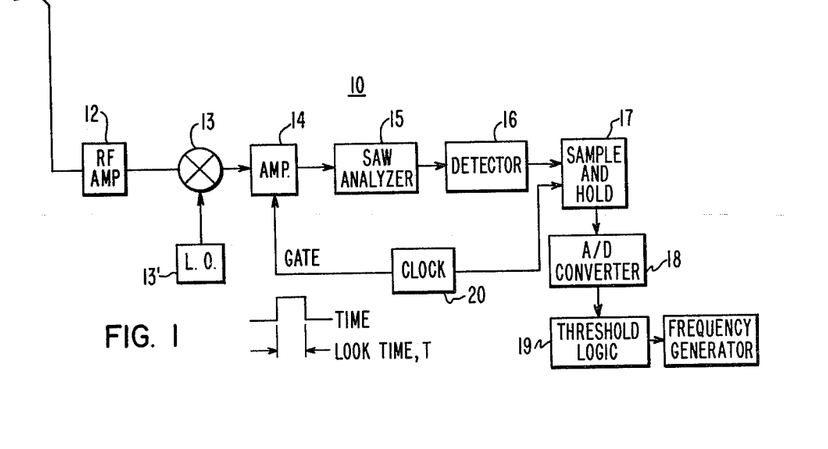
FIG. 1 is a schematic block diagram of a jamming analysis and transmission system in accordance with one embodiment of the present invention.

Referring to FIG. 1, a jamming analysis and transmission system (JATS) 10 includes an antenna 11, that is preferably the antenna of the radar system in which the JATS system is employed, and is connected to an RF amplifier 12 for amplifying the frequencies collected by the antenna 11. The RF amplifier 12 is output to a mixer 13 which may be required in some applications so that the local oscillator 13' of the radar system heterodynes the received frequencies to a practical operating center frequency of from 200 to 800 megahertz, for example. A gated amplifier 14 is provided to amplify the heterodyned frequencies from the mixer 13 and apply the received frequencies simultaneously to a surface acoustic wave (SAW) device 15 for a discrete receiving time interval T. The SAW device 15, which will be described in detail in connection with FIG. 2 herein, performs an analysis of the frequencies that are received during such discrete time interval T by unrolling the frequencies down the length of the device. Such a spatial distribution of received frequencies results in different frequencies taking different times to output from the SAW device 15; thus, translating each frequency to the time domain as explained in more detail hereinafter. A detector 16, which may be a conventional envelope detector, removes the RF portion of the output of the analyzing device 15 leaving only the envelope of the signals. The resulting video signal is then sampled during each of a plurality of narrow sampling time intervals ST (FIGS. 4 and 5), with the output signal at each of such intervals ST serving to identify the presence or absence of energy at each predetermined frequency. The sampling times ST are controlled to commence at a predetermined time subsequent to each time T and at predetermined time intervals by a conventional clock device 20. The sample and hold device 17 also serves to store each of such samples which may then be output serially and quantized by an A/D converter 18. The digitized signals from the converter 18 may be then applied to conventional threshold logic circuitry 19 that functions to detect each of the digitized signals from the converter 18, that are either above or below a predetermined threshold, to shift the frequency generator of the transmitter to a selected one of such low threshold signals or preventing a shift to a high threshold signal for controlling the output of the frequency generator of the transmitter within its bandwidth.

When such a system 10 is utilized in a pulse type radar system, the amplifier 14 is gated to pass the electromagnetic environment collected by the antenna 11 subsequent to each transmit pulse of the radar. The mixer 13 requires the local oscillator 13' that mixes the frequencies to be analyzed down to the center frequency of the SAW device 15.

Figure 2:
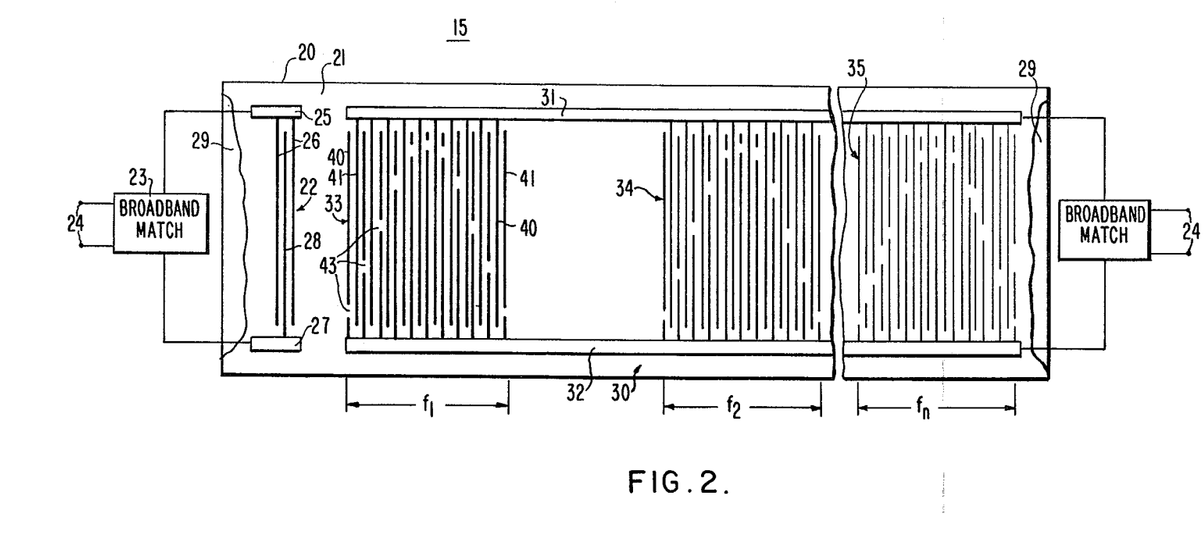
FIG. 2 is a diagram of a surface acoustic wave device utilized in the system of the present invention according to one embodiment thereof.

Referring to FIG. 2, the surface acoustic wave device 15 comprises a substrate 20 which may be piezoelectric or non-piezoelectric using piezoelectric overlayers preferably having a polished surface 21 on which is deposited a metallized pattern or array 22 that functions as a broadband input transducer of the device 15. As is well known, the input transducer 22 converts to acoustic signals the electrical signals received from a broadband matching transformer 23, to which is applied on input 24, those frequencies that are present during the discrete detecting time interval T from the amplifier 14. As is well known, the broadband matching transformer 23 is of the type that resonates all capacitances in the circuit and removes the effect of capacitance in the device, so that the input frequencies from a low impedance source are converted to the high impedance inherent in the device 15, so as not to change the input waveforms while increasing the signal level. The pattern 22 is comprised of a first continuous metallized pattern that includes a conductor 25 and a pair of spaced parallel fingers 26 that extend transverse to the direction of wave propagation. Also, the array 22 is comprised of a conductor 27 that is spaced from the conductor 25 and has connected thereto a finger 28 that extends between the fingers 26 thus forming an interdigitated pattern. The input transducer in order to be broadband should have very few fingers such as 26 and 28, preferably two, three, or four. However, as an alternative, the input transducer 22 may have a well known broadband chirp pattern with as many as ten finger pairs. The example in the description of the present invention, is for a surface acoustic wave device that covers a range from 150 megahertz to 250 megahertz which would require one and one-half finger pairs for the non-chirp design with the finger width and spacing corresponding to 200 megahertz. The dimensions of two finger widths and two spacings, which is the finger-pair dimension in the direction of wave propagation, is given by the formula $$\lambda_s = v_s/f_o$$

where $\lambda_s$ is the surface wave wavelength, $v_s$ is the surface wave velocity, and $f_o$ is the midband frequency of the spectrum to be analyzed by the device 15. The relationship of the finger widths and spacings between the fingers have the well-known relation to wavelength and is configured so that each finger width and spacing is equal to $\lambda_s/4$. In the opposite direction from the desired propagation direction is placed an acoustic absorber 29, such as RTV to remove unwanted reflections which would interfere with the intended performance.

Spaced from the input transducer pattern or array 22 in the direction of wave propagation is a metallized analyzing pattern or array generally referred to as 30. The array 30 is bounded by a pair of longitudinally extending metallic conductors 31 and 32 that are spaced from one another transverse to the direction of wave propagation and extend in the direction of wave propagation. These are connected to an output broadband matching transformer similar to 23, and provide essentially instantaneous electrical output when an acoustic wave packet interacts with the interdigital fingers. Extending from the elongated conductors 31 and 32, are a plurality of groups of interdigitated finger patterns referred to as 33, 34 and 35, respectively. Each of the groups such as 33, 34 and 35 as shown in FIG. 2, are spaced from one another a predetermined distance as described hereinafter in the direction of wave propagation. The individual metallized fingers such as fingers 40 and 41 of the array or group 33 extend transverse to the direction of wave propagation to form an interdigitated pattern. The fingers 40 extend from the elongated conductor 32 and the fingers 41 extend from the elongated conductor 31 to provide such interdigitation. The finger width of the fingers 40 and 41 and the spacing therebetween, which dimensions are in the direction of wave propagation, is selected to be synchronous for a particular one of the anticipated frequencies that are received. For example, assuming that the device 15 is designed to analyze frequencies in a spectrum between 150 and 250 megahertz, and further assuming that the array 33 is designed to be synchronous with the frequency $f_1$ which is 150 megahertz, each finger width 40 and 41 and each spacing therebetween would be equal to $3158/(4 \times f_1)$ or 5.26 microns (3158 m/sec being $v_s$ for quartz). Similarly, the finger width and spacing for a 250 megahertz frequency would equal $3158/(4 \times f_1)$ or 3.158 microns. The finger widths and spacings for frequencies in between are calculated in a similar manner. Assuming that the gated amplifier 14 provides a discrete time interval of one microsecond, then the number of fingers 40 and 41 would have to be at least sufficient to provide a one microsecond impulse response. Since each finger pair, that is a finger 40, the space therebetween, the finger 41, and the subsequent space, creates one wavelength, the number of finger pairs is given by the product of the time duration and the center frequency. Thus, 150 finger pairs for the group 33 yields a one microsecond duration at 150 megahertz. It is to be noted that each of the fingers 41 that extend from the elongated conductor 32 have gaps therein referred to at 43 that provide discontinuity in such fingers 41 in an overall group configuration that corresponds to a Gaussian filter shape. Although the Gaussian shape is illustrated for weighting each of the frequency responses, for certain applications alternate weighting may be utilized such as the Hamming weighting, or the well-known raised cosine weighting, for example. If the radar receiver that is to be protected from interfering frequencies has a (sin $x/x)^2$ frequency response shape, then the gap weighting for each group of fingers such as 33, would have a triangular shape because the Fourier transform of (sin $x/x)^2$ is a triangle. It follows then that the Gaussian response requires a Gaussian gap weighting as shown in FIG. 2 and the alternate responses would of course require a corresponding type of gap weighting.

The individual groups 34 and 35 are configured similar to the previously described group 33 except that the finger width and spacing of the group 34 is such that it is synchronous at a different frequency such as $f_2$. Similarly, the group 35 is configured the same as 33 and 34 except the finger width and spacing is such that it is synchronous at a frequency $f_n$. Typically, sixteen possible transmit frequencies are available over a 100 megahertz bandwidth; thus, each adjacent group of fingers are configured such that each succeeding group is resonant at a frequency that is approximately 6.25 megahertz different than the preceding group. Thus, the device 15 in such an example, would have sixteen spaced groups of fingers, each of which are configured to be synchronous at a spacing of approximately 6.25 megahertz.

For maximum response to each one of the sixteen different frequencies for example, the discrete gate interval of the amplifier 14 preferably equals the duration of the impulse response of each separate frequency in the individual groups of interdigitated fingers. Such a spacing satisfies the matched filter condition and yields good discrimination between such frequencies. The length in the direction of wave propagation of each individual group of interdigitated fingers may be longer such that the propagation time exceeds the gate interval but this, of course, would require longer substrates.

Figure 3:
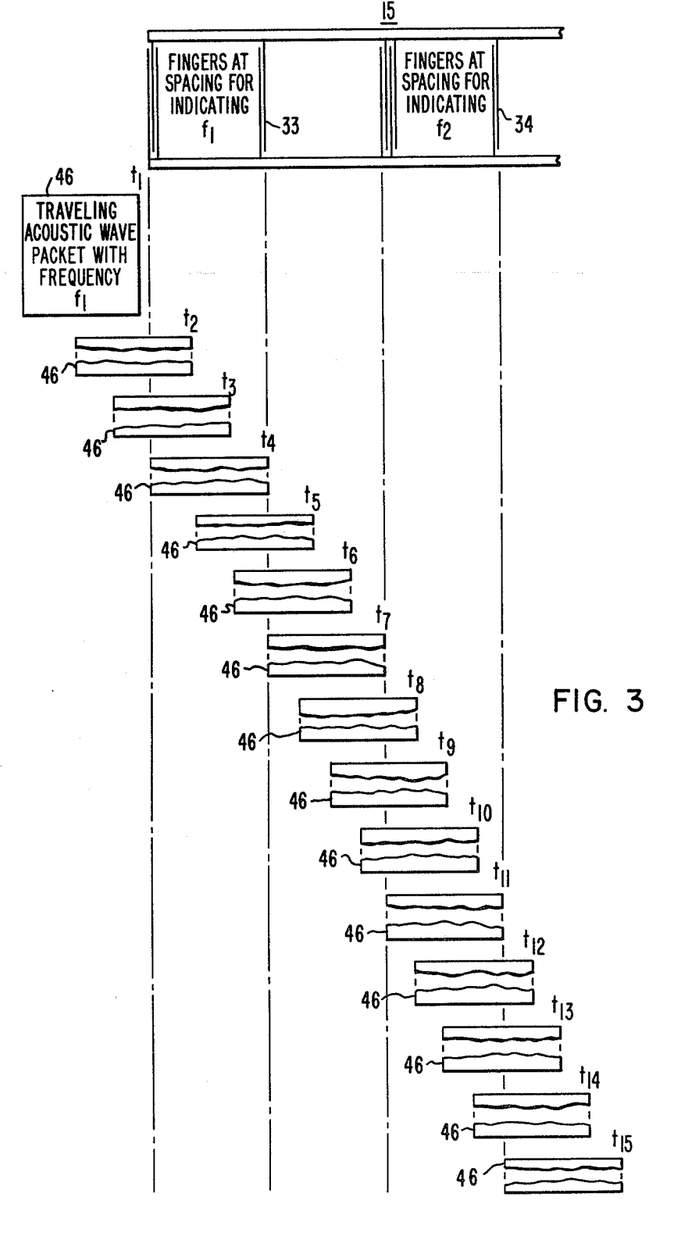
FIG. 3 is a fragmentary view of the device of FIG. 2 illustrating the movement in time of an acoustic wave packet.

Referring to FIG. 3, a traveling acoustic wave packet generally referred to at 46, which was received during the receiving time T, is assumed to be at the frequency $f_1$. Since the frequency $f_1$ is synchronous with the finger width and spacing of the group 33, the amplitude of the waveform is greatest when the packet 46 is resident in the group 33 as shown by $46t_4$.

Figure 4:
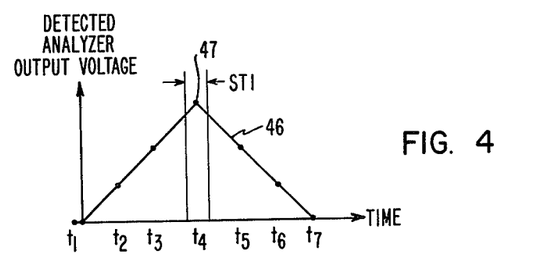
FIGS. 4 and 5 are graphs illustrating the voltage at the output of the device of FIG. 2 during different time intervals of FIG. 3 including times when the acoustic wave packet is in synchronous and non-synchronous group, respectively.

The wave packets $46t_1$ through $46t_{15}$ illustrates the acoustic wave packet 46 schematically in advancing "snapshot" positions as it travels down the device 15 during each of such times $t_1$ through $t_{15}$ as shown in FIG. 3. The output voltage is sampled only during the sampling times ST. In FIG. 4, assuming that the packet 46 includes a frequency $f_1$, the output sampling time ST1, occurs when the packet has reached substantially complete residency in group 33 (see $46t_4$), when the amplitude of the voltage is greatest as shown at point 47. As the packet 46 continues to travel down the device 15, another sample is taken during time ST2 (See FIG. 5). Assuming that the packet 46 does not include a frequency $f_2$ then the amplitude at time ST2, is minimal as shown by point 48 of FIG. 5. Thus, the sampling time ST is repeated at the time when the wave packet becomes substantially resident in each finger group until the packet has traveled throughout the length of the device 15.

Figure 5:
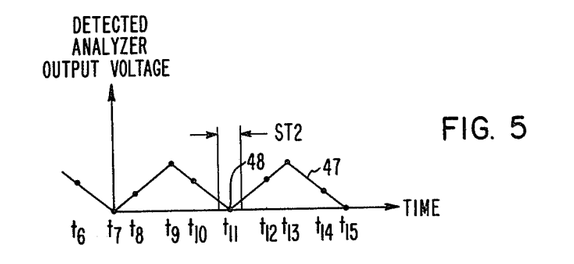

Thus, with references to FIGS. 3, 4 and 5, and by the principle of superposition, a plurality of frequencies can be simultaneously seen by the gate 14 and launched at the input end of the device 15 and pass under the groups of fingers in succession. When one of the frequencies is synchronous with one of the finger groups, an output such as 47 of FIG. 4 is obtained. In the event that none of the frequencies are synchronous as they pass under a particular group of fingers, then an amplitude similar to 48 of FIG. 5 is obtained. Since the frequencies pass under the individual groups in succession, a particular frequency that happens to be synchronous with one of the groups may occur during a corresponding portion of the time period involved. For example, assuming that there are sixteen different finger groups with the spacing therebetween, together with an absolute delay at the input and output ends of approximately one microsecond, then the propagation time for the received frequencies in the wave packet 46 is approximately 35 microseconds. Therefore, in 35 microseconds the entire jamming analysis is completed. This period is relatively short when compared to a typical radar interpulse period so that there is time to perform such analysis several times per interpulse period, or at some specified instant in such interpulse period, if desired. The area between the lines ST of FIGS. 4 and 5 is selected as the sampling time slot that is synchronized with the beginning of the discrete timing interval that opens the gated amplifier 14 and permits the received frequencies to pass. Although the dimension of each finger group is such that the frequencies occuring during the receiving interval T are substantially equal to the duration thereof as they travel through the device, each group can be slightly longer without affecting the amplitude as previously mentioned.

Figure 6:
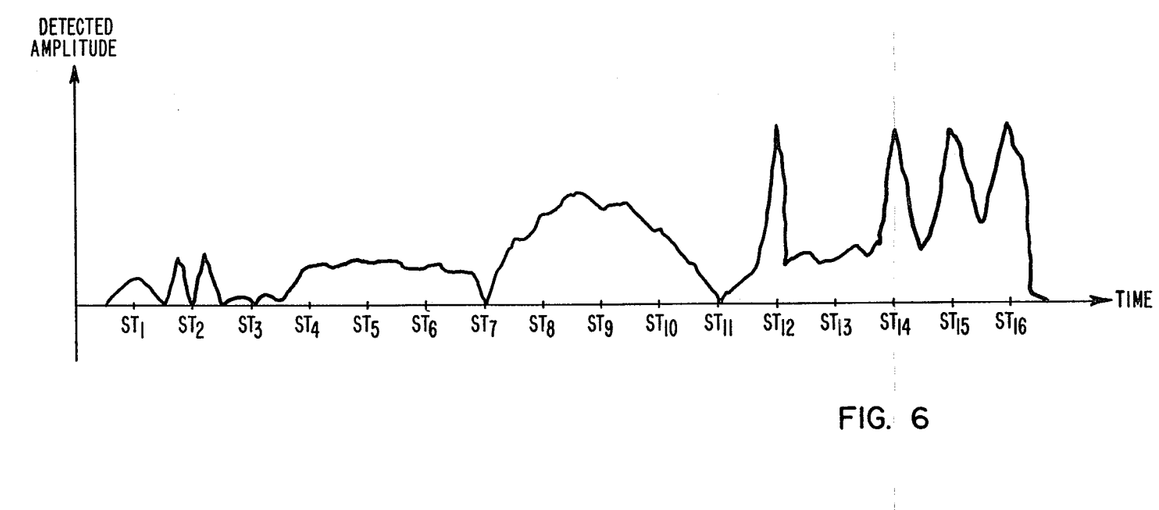
FIG. 6 is a graphical illustration showing an actual response in the time domain of a plurality of frequencies applied to the input of the surface acoustic wave device of FIG. 2.

Referring to FIG. 6, a graph is illustrated showing the amplitude of the signals passing through the device 15 as a function of time after detection. In such example, it is assumed that the frequencies take one microsecond to traverse each one of the finger groups and one microsecond to traverse the space therebetween, thus creating a delay of approximately two microseconds per frequency in the propagating waveform. An approximate one microsecond delay is also assumed at the input of the device. Thus, it is seen in FIG. 6 that at the time interval $ST_1$ there is a slight amount of noise; while at the time slots $ST_2$ and $ST_3$ there is little or no noise. In the time slots shown as $ST_4$ through $ST_6$, there is a fair amount of noise present at such frequencies; and slightly more interfering frequencies may be detected at the time slots shown as $ST_8$ through $ST_{10}$. Note that at the time slot $ST_{11}$, there is little or no interference; and slight interference at the sampling time slot $ST_{13}$. However, it is to be noted that large amplitudes appear at the time slots $ST_{12}$, $ST_{14}$, $ST_{15}$, and $ST_{16}$ indicating that the interfering frequencies are $f_{12}$, $f_{14}$, $f_{15}$, and $f_{16}$. Therefore, in accordance with the analysis, the frequency generator of the transmitter of the system could be shifted to any of the frequencies with the exception of the group last mentioned; but preferably, such frequency generator should be shifted to frequency $f_2$, $f_3$, $f_7$, or $f_{11}$.

Figure 7:
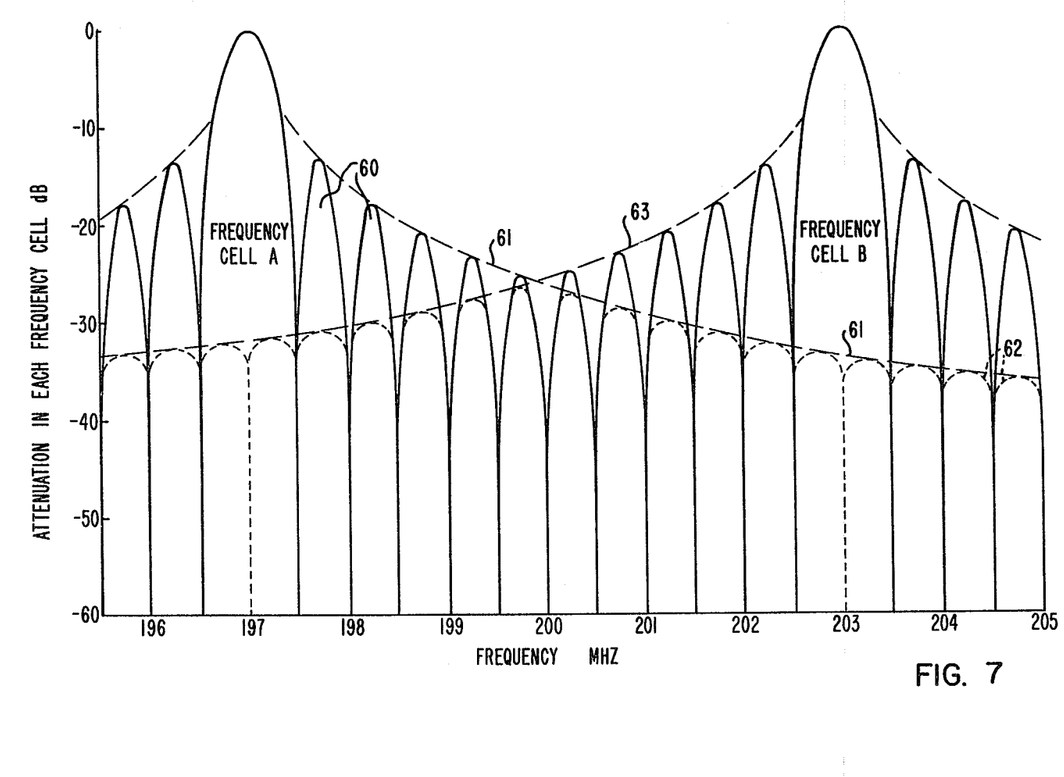
FIG. 7 is a graph illustrating the discrimination between several different frequencies for adjacent groups of interdigitated fingers that are synchronous with different frequencies spaced approximately six megahertz apart.

Referring to FIG. 7, each one of the spaced finger groups may be thought of as, and termed frequency cells. Assuming that the finger group or frequency cell A of FIG. 7 is configured to resonate at 197 megahertz, and assuming that the frequency cell B that is spaced adjacent to the frequency cell A of the device 15 resonates at a frequency of approximately 203 megahertz, which frequency is approximately 6 megahertz from the frequency cell A, the attenuation in the frequency cell A is zero from 197 megahertz and in frequency cell B is practically zero at 203 megahertz. However, assuming that another frequency occurs, that is at 196 megahertz, the attenuation is approximately 40 dB or more in the frequency cell A. Similarly, as noted by curves 60, which represents the response in the frequency cell A for 198 megahertz, the attenuation in dB is approximately the same as that for 196 megahertz. This attenuation increases as shown by dashed line 61 for the frequency cell A so that such attenuation is approximately 35 dB minimum as noted by dashed lines 62 at the top of the associated curves. Furthermore, there are high attenuation nulls periodic in frequency and by well known design procedures they can be forced to occur at the center frequency of the adjacent frequency cell as shown by dashed line 61 in FIG. 6. Thus a frequency 203 MHZ would yield a very low output voltage in frequency cell A and therefore it follows that this frequency in the traveling wave packet would not be identified as the frequency corresponding to frequency cell A, namely 197 MHZ. Similarly, for the frequency cell B which resonates at 203 megahertz, the attenuation for each one megahertz deviation in frequency increases the minimum attenuation from approximately 12 dB to approximately 35 dB as noted by dashed line 63 that defines the amplitude of each of the curves thereunder and the nulls are so configured that one occurs at 197 MHZ, the middle of frequency cell A. This positioning of nulls can be configured to occur at or sufficiently close to the frequencies of all adjacent cells by allowing the duration of the groups of fingers to depart slightly from the ideal duration, V.I.Z. that of the gate. Thus there is clear identity of frequency from the output of each cell and very low probability of confounding one frequency with another.

In summary, the frequency analysis device 15 of the system 10 has as many fingered groups or frequency cells as there are discrete frequencies that are anticipated. The impulse response of each group of fingers should have a duration as a minimum approximately equal to the gate or look time of the amplifier 14 so as to closely satisfy the matched filter condition to yield a large output signal for a received resonant frequency. This condition also requires that there be a space between each finger group that is approximately equal to such gate time in order to avoid time interference. Frequency interference is avoided by forcing the response 60 of any one cell to be at a null in all adjacent cells.

Once the arrangement and function of the detector 16, the sample and hold circuitry 17, the A/D converter 18, and the threshold logic circuitry 19 as shown in FIG. 1 is realized, the actual implementation of such circuitry to accomplish the desired result is well known in the prior art and needs no further explanation. However, it should be pointed out that the timing samples ST are made in narrow time bands wherein the average value in each band may be stored in a conventional capacitor arrangement of the sample and hold circuit 17. If for instance, one were to view the narrow time slots ST as shown in FIGS. 4 and 5, and they were centered at approximately 16 microseconds, or at $ST_8$ after the sample and hold function a DC voltage with a magnitude proportional to the energy in the environment at the frequency $f_8$ is measured. If the frequency of the signal input into the SAW device 15 were scanned over the entire bandwidth of the device while measurements were made of the DC voltage magnitude at 16 microseconds, a measure of discrimination of the analyzer device 15 is obtained; that is, its ability to identify frequency $f_8$, for example, without confusing it with another frequency. This would yield curves similar to FIG. 7 for $f_8$ and its adjacent frequency cell. The A/D converter 18, may be a conventional eight bit unit that is readily available as a standard manufactured component which has adequate processing times. Such an A/D converter 18 quickly converts the analog signal levels stored in the hold capacitor of the sample and hold circuit 17 into a digital word that represents the relative voltage level on each capacitor. The threshold logic 19 is assumed to include preferably a programmable read-only memory that is specifically programmed to accept such digital words and search for those exceeding certain thresholds. The addresses of such digital words may be interpreted as frequencies to be avoided. The remaining addresses are frequencies that may be used by the radar for transmission of the next pulse. These addresses may be fed to a conventional programmable frequency generator in the transmitter section of the radar in any conventional manner.

The metallized pattern groups such as 33, 34 and 35 may be very accurately deposited on the substrate 20 of the device 15 by using a well-known Gerber plotter. A frequency difference accuracy in the dimensions of such finger groups can be obtained that is less than 0.05%. Aluminum patterns may be produced on any piezoelectric substrate using a well-known metal lift-off technique in order to maintain the high resolution where two hundred megahertz or higher patterns are envisioned. Quartz appears to be a preferable substrate because the analyzer 15 would be stable within plus or minus 0.01% over wide temperature ranges. However, other substrates may be required for very broadband analyzers. For example, it is possible to launch acoustic waves on non-piezoelectric substrates using piezoelectric overlayers such as $Z_nO$. It is understood that alternate configurations may be utilized in practicing the present invention such as connecting each frequency group to a separate terminal and strobing the terminals, for example. Further, it may be that two parallel devices 15 may be fed from a conventional power splitter with alternate frequencies on different units in the event it is desired to obtain wider frequency separation between adjacent groups of interdigitated fingers. It is also true that the cells adjacent in frequency do not necessarily have to be adjacent in time. If the frequencies to be identified are close together or if the analysis time is required to be very short (high resolution and fast decision time, respectively) the nulls of FIG. 7 can be spread out so far that there will be confounding of adjacent frequencies. In this case the occurrence of groups of fingers in the propagation direction can be so arranged that close frequencies are far apart in time.

I claim:

1. A jamming analysis and transmission selection system for a radiant energy communication or radar system, comprising:
   a surface acoustic wave device having a plurality of spaced groups of interdigitated metallic fingers, each group having a finger width and spacing therebetween to resonate at a single different one of said frequencies,
   means to receive interfering frequencies throughout a predetermined bandwidth, only throughout a predetermined discrete time interval,
   means to launch the interfering frequencies contained in the discrete time interval as an acoustic surface wave packet on a SAW substrate having a frequency analysis pattern,
   sampling means operatively connected to said wave device to detect the amplitude of received frequencies at each of a plurality of discrete sampling time each said sampling time occurring during a preselected time interval subsequent to the occurrence of the discrete time interval,
   and means to identify the presence of each of the interfering frequencies as a function of the amplitude of the received frequencies during each of said sampling times.

2. A system according to claim 1 wherein said sampling means includes means to detect the amplitude of received frequencies at each discrete sampling time that occurs during a preselected time interval corresponding to the time that the received frequencies are substantially resident in one of the finger groups.

3. A system according to claim 1 wherein the means to receive the interfering frequencies includes means to control the length of the discrete receiving time interval to be at most equal to the time of wave propagation under one of the finger groups.

4. A system according to claim 1 wherein the length of each space between finger groups is substantially equal to the length of each finger group in the direction of wave propagation.

5. A system according to claim 1 wherein each finger group is weighted in a predetermined configuration to substantially correspond to response of the receiving means.

6. A jamming analysis and transmission selection system for a radiant energy communication or radar system, having means to receive interfering frequencies throughout a predetermined bandwidth during a predetermined discrete time interval, comprising
   a surface acoustic wave device having a plurality of spaced groups of interdigitated metallic fingers connected by common conductors, each group having a finger width and spacing therebetween to resonate at a predetermined one of said interfering frequencies,
   a detector to remove the r.f. portion of the analyzer output,
   sampling means to detect voltage amplitude on said common conductors after detection during each of a plurality of discrete sampling time intervals, said sampling time intervals occurring when the interfering frequencies are resident in each one of the plurality of groups,
   each one being identified with a respective resonant group, and
   means to determine the discrete predetermined frequencies received in accordance with the voltage amplitude during a respective one of the coupling time intervals.

7. A system according to claim 6 wherein each of the finger groups of the surface acoustic wave device spaced substantially equidistant from each other in the direction of wave propagation.

8. A system according to claim 6 wherein each finger group of the surface acoustic wave device is of a length in the direction of wave propagation to include at least all the cycles of the frequencies received during the discrete receiving time interval.

9. A system according to claim 8 wherein the spacing between each finger group is substantially equal to the length of each finger group.

* * * * *